(12) United States Patent
Tsuji et al.

(10) Patent No.: US 8,061,780 B2
(45) Date of Patent: Nov. 22, 2011

(54) CUSHION FOR SEAT

(75) Inventors: Fumitaka Tsuji, Tochigi (JP); Takahito Yabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 197 days.

(21) Appl. No.: 12/097,828

(22) PCT Filed: Dec. 19, 2006

(86) PCT No.: PCT/JP2006/325686
§ 371 (c)(1),
(2), (4) Date: Oct. 16, 2009

(87) PCT Pub. No.: WO2007/072964
PCT Pub. Date: Jun. 28, 2007

(65) Prior Publication Data
US 2010/0038952 A1  Feb. 18, 2010

(30) Foreign Application Priority Data

Dec. 19, 2005  (JP) ................................. 2005-365632

(51) Int. Cl.
*A47C 7/02* (2006.01)
(52) U.S. Cl. ........... 297/452.58; 297/452.62; 297/218.1; 297/219.1
(58) Field of Classification Search ............... 297/219.1, 297/228.3, 218.1, 452.58, 452.61, 452.62
See application file for complete search history.

(56) References Cited

U.S. PATENT DOCUMENTS

| | | | | | |
|---|---|---|---|---|---|
| 4,019,776 | A | * | 4/1977 | Takamatsu | ................. 297/219.1 |
| 4,047,756 | A | * | 9/1977 | Ney | ............................ 297/219.1 |
| 4,388,738 | A | * | 6/1983 | Wagner | ............................. 5/421 |
| 6,079,779 | A | * | 6/2000 | Tanaka et al. | ............. 297/228.13 |
| 6,632,756 | B1 | * | 10/2003 | Waldrop et al. | ................ 442/314 |
| 7,255,405 | B2 | * | 8/2007 | Kodera et al. | ............. 297/452.62 |

FOREIGN PATENT DOCUMENTS

| | | |
|---|---|---|
| JP | 8-112161 | 5/1996 |
| JP | 2000-342393 | 12/2000 |
| JP | 2005-110946 | 4/2005 |
| JP | 2005-262628 | 9/2005 |

OTHER PUBLICATIONS

International Search Report of International Application No. PCT/JP2006/325686, filed Dec. 19, 2006.

* cited by examiner

*Primary Examiner* — Laurie Cranmer
(74) *Attorney, Agent, or Firm* — Dann, Dorfman, Herrell and Skillman, P.C.

(57) ABSTRACT

A cushion for a seat of good appearance. The cushion for a seat comprises a three-dimensional cover constituted of a front surface portion, a substantially U-shaped rear surface portion arranged oppositely to the front surface portion while spaced apart therefrom, a circumferential surface portion arranged between the front surface portion and the rear surface portion while connecting at the edge thereof with the edge of the front surface portion and the edge of the rear surface portion, a stripe portion extending downward from the upper edge of an opening in the rear surface portion to close the opening, a first pair of teeth tapes fixed to the opposite side edges of the stripe portion, and a second pair of teeth tapes provided at the opposite side edges of the circumferential surface portion corresponding, in position, to the opposite side edges of the stripe portion and engaging with or disengaging from the first pair of teeth tapes so that the opening is closed or opened by the stripe portion, and a foamed resin pad molded integrally with each component of the cover, excluding the stripe portion, in the cover.

5 Claims, 8 Drawing Sheets

CUSHION FOR SEAT

TECHNICAL FIELD

This invention relates to a cushion for a seat, in which a foam resin padding is integrated with a three-dimensional cover covering the foam resin padding and, more particularly, to a cushion in which a rear side section of a three-dimensional cover is adapted to be openable and closable with slide fastener means.

BACKGROUND ART

As a cushion for a seat back of a seat, which is formed by causing a foam resin padding and a three-dimensional cover covering the foam resin padding to be integrated with each other by a die apparatus, there is proposed a cushion for a seat back, which is disclosed in Japanese Patent Application Laid-Open No. 2005-262628, for example.

When the cushion is to be formed by the die apparatus, the three-dimensional cover is laid in the die apparatus. In this condition, expandable resin is poured into an interior of the three-dimensional cover through the die apparatus and allowed to foam, whereby a padding of the foaming resin integral with the cover is formed. In this way, a finished cushion is formed. After the finished cushion is formed and removed from the die apparatus, a seat back frame for supporting the cushion is incorporated in the padding. For this purpose, the die apparatus includes a core for forming a cavity opened at a rear side of the padding for receiving the seat back frame. When the three-dimensional cover is laid in the die apparatus, the core is inserted in the three-dimensional cover. In order that the three-dimensional cover can receive the core when it is laid in the die apparatus, a rear side section of the three-dimensional cover is adapted to be openable and closable with respect to the cover by slide fastener means.

Figure 1:
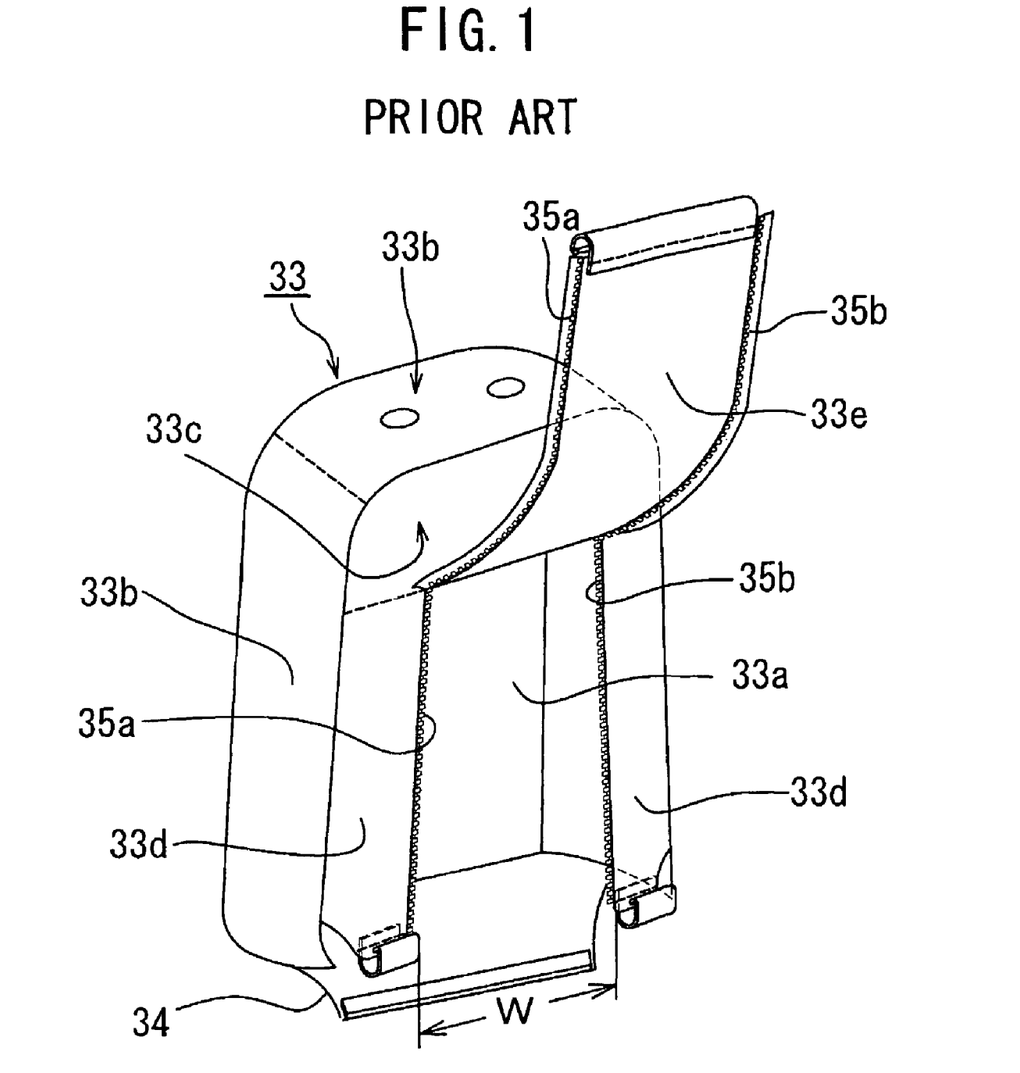
FIG. 1 is a schematic perspective view of a cover for a related art cushion, in which the cover is opened at a rear side section thereof.
Figure 2:
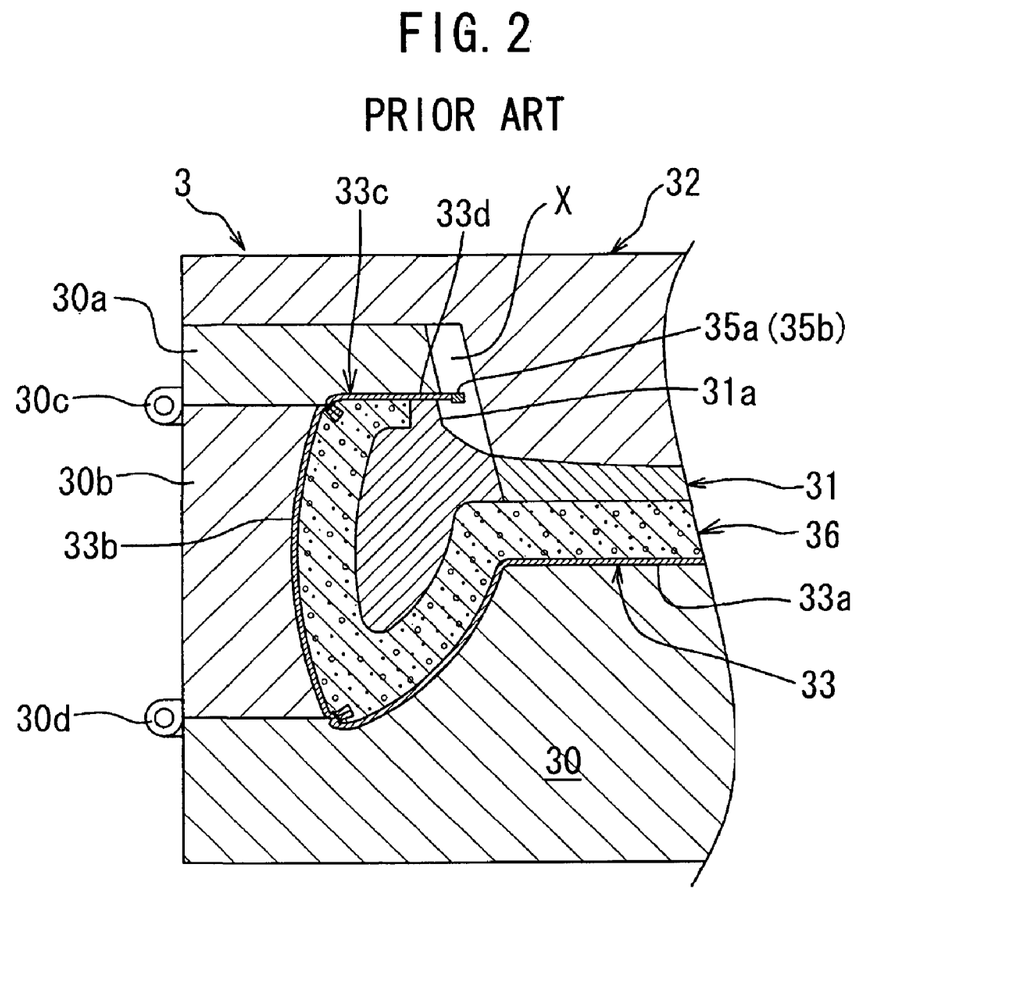
FIG. 2 is a sectional view showing a die apparatus for forming the related art cushion.

Referring now to FIGS. 1 and 2, the related art cushion will be discussed hereinafter in order to facilitate understanding of the present invention.

Referring to FIG. 1, the cushion includes the three-dimensional cover 33, in an interior of which the foam resin padding (not shown) is integrated with the three-dimensional cover 33. The cover 33 includes a front side piece 33a, a rear side piece 33c spaced apart from the front side piece 33a and opposed to the front side piece 33a, a peripheral piece 33b disposed between the front side piece 33a and the rear side piece 33c, extending along peripheral edges of the front side and rear side pieces 33a, 33c except lower edges of the front side and rear side pieces 33a, 33c, and sewed to the peripheral edges of the front side and rear side pieces 33a, 33c at edges of the peripheral piece 33b, and a lower side piece 34 sewed at an edge thereof to a lower edge of the front side piece 33a. The rear side piece 33c is formed substantially into a U-shape and includes a pair of spaced apart side sections 33d, an upper section connected to upper edges of the spaced apart side sections 33d and interconnecting the spaced apart side sections 33d, and a belt-shaped intermediate piece 33e. The intermediate piece is attached at an upper edge thereof to a lower edge of the upper section of the rear side piece 33c and is adapted to be coupled at left and right side edges thereof to inner edges of the side sections 33d by first and second slide fastener means, whereby an opening of the rear side piece 33c is openably closed by the intermediate piece 33e. The first slide fastener means includes a pair of first and second zipper tapes 35a which are provided along the left side edge of the intermediate piece 33e and an inner edge of a left side section of the rear side piece 33c, and a first slider assembly (not shown). The first slider assembly, supported by the first and second zipper tapes, is included for zipping and unzipping the first zipper tape with respect to the second zipper tape. Moreover, the second slide fastener means includes a pair of third and fourth zipper tapes 35b which are provided along the right side edge of the intermediate piece 33e and an inner edge of a right side section of the rear side piece 33c, and a second slider assembly (not shown). The second slider assembly, supported by the third and fourth zipper tapes, is included for zipping and unzipping the third zipper tape with respect to the fourth zipper tape. Thus, the intermediate piece 33e is configured so as to be separatable from the side sections 33d of the rear side section 33c by the first and second slide fastener means, so that the cover is openable at the rear side section thereof. The foam resin padding in the cover 33 is integrated with the respective sections of the cover 33 except the intermediate piece 33e and the lower side piece 34.

The cushion which includes the cover 33 constructed as discussed above and the foam resin padding is formed by utilizing a die apparatus 3 which is partially illustrated in FIG. 2. The die apparatus 3 includes a first die means 30 for forming front and rear sections of the cushion and a peripheral section of the cushion, a core 31 for forming a cavity opened at a rear side of the foam padding 36 for receiving a seat back frame (not shown), and a second die means 32 which is adapted to be combined with the first die means 30 and clamped against the first die means 30, when the cushion is to be formed by the die apparatus. The first die means 30 is provided with a first sectional die means 30a for forming the rear side section of the cushion, and a second sectional die means 30b for forming the peripheral section of the cushion. The first sectional die means 30a is coupled to the second sectional die means 30b by a first hinge means 30c. The second sectional die means 30b is coupled to the first die means 30 by a second hinge means 30d. Thus, the first and second sectional die means 30a, 30b can be opened and closed with respect to the first die means 30 by the first and second hinge means 30c, 30d.

When the cushion is to be formed by the die apparatus, the second die means 32 is removed from the first die means 30, the first and second sectional die means 30a, 30b are opened with respect to the first die means 30 by the first and second hinge means 30c, 30d, and the cover 33 is then laid on a die surface of the first die means 30 with the intermediate piece 33e being separated from the side sections 33d of the rear side piece 33c of the cover 33 by unzipping the first and third zipper tapes of the intermediate piece 33e from the second and fourth zipper tapes of the side sections 33d of the rear side piece 33c. Then, the core 31 is inserted within the three-dimensional cover 33 and the first and second sectional die means 30a, 30b are closed with respect to the first die means 30 by the hinge means 30c, 30d. At this time, each of the zipper tapes 35a, 35b provided at the both side sections 33d of the substantially U-shaped rear side piece 33c is located within a space X between the second die means 32 and the core 31, and each of the both side sections 33d of the substantially U-shaped rear side piece 33c becomes pinched by a protrusion 31a of the core 31 and the first sectional die means 30a. In this condition, the second die means 32 is combined with the first die means 30 and clamped against the first die means 30, and expandable resin is poured into the interior of the cover 33 and foams in the interior of the cover 33, whereby the cushion in which the padding 36 of the foaming resin is integrated with the cover 33 and formed with the cavity for receiving the seat back frame is formed. Each of the both side sections 33d of the substantially U-shaped rear side piece 33c is pinched by the protrusion 31a of the core 31 and the first sectional die means 30a as discussed above, so that the foaming resin will not adhere to a surface of the cover 33 and/or the zipper tapes 35a, 35b.

However, in the related art cushion constructed as discussed above, the front side piece 33a is sewed to the peripheral piece 33b, and the peripheral piece 33b is sewed to the rear side piece 33c, so that there are many sewed portions between the front and rear side pieces 33a, 33c and the peripheral piece 33b, thus detracting from the visual appearance of the cushion.

Moreover, if it is necessary to provide a pocket on a rear surface of the related art cushion, the pocket is obliged to be provided on the belt-shaped intermediate piece from the viewpoint of facilitating the assembling of the cushion. Therefore, only a pocket having a narrow width can be provided on the intermediate piece but a pocket having a wide width can not be provided on the intermediate piece.

DISCLOSURE OF THE INVENTION

It is, therefore, an object of the present invention to provide a cushion for a seat, in which a cover of the cushion is openable at a rear side thereof and which has a good visual appearance.

It is another object of the present invention to provide a cushion for a seat, in which a pocket having a wide width is allowed to be provided.

In accordance with the present invention, there is provided a cushion for a seat, including a foam padding integral with a three-dimensional cover covering the padding, the three-dimensional cover comprising a first section, a second section spaced apart from the first section and facing the first section, the second section having an opening, a peripheral section disposed between the first and second sections, extending along peripheral edges of the first and second sections, and attached at edges thereof to the peripheral edges of the first and second sections, a substantially belt-shaped piece having a width equal to a total width of the cover and provided at the second section so as to openably close the opening of the second section, a first pair of zipper tapes, one of the first pair of zipper tapes being provided along one of both side edges of the belt-shaped piece, the other of the first pair of zipper tapes being provided along a first region of the edges of the peripheral section which positionally corresponds to the one of the both side edges of the belt-shaped piece, a second pair of zipper tapes, one of the second pair of zipper tapes being provided along the other of the both side edges of the belt-shaped piece, the other of the second pair of zipper tapes being provided along a second region of the edges of the peripheral section which positionally corresponds to the other of the both side edges of the belt-shaped piece, a first slider assembly supported by the first pair of zipper tapes for zipping and unzipping the first pair of zipper tapes, and a second slider assembly supported by the second pair of zipper tapes for zipping and unzipping the second pair of zipper tapes, the opening of the second section being adapted to be closed with the belt-shaped piece at the time when the first slider assembly and the second slider assembly zip the first pair of zipper tapes and the second pair of zipper tapes, respectively, the padding being integrated with sections of the cover except the belt-shaped piece.

The belt-shaped piece may be provided with a pocket which is openable along a total width of the belt-shaped piece. The second section may have folded both side edges which are sewed to regions of a peripheral edge of the peripheral section. Moreover, a longitudinal edge of the other of the first pair of zipper tapes, and a longitudinal edge of the other of the second pair of zipper tapes may be superposed on and sewed to the folded both side edges of the second section.

These and other objects and many of the attendant advantages of the present invention will be readily appreciated as the same becomes better understood by reference to the following detailed description when considered in connection with the accompanying drawings.

DETAILED DESCRIPTION OF THE PREFERRED EMBODIMENTS

Embodiments of a cushion for a seat according to the present invention, for example, embodiments of a cushion for a seat back of a vehicle seat will be discussed hereinafter with reference to FIGS. 3 to 11.

Figure 3:
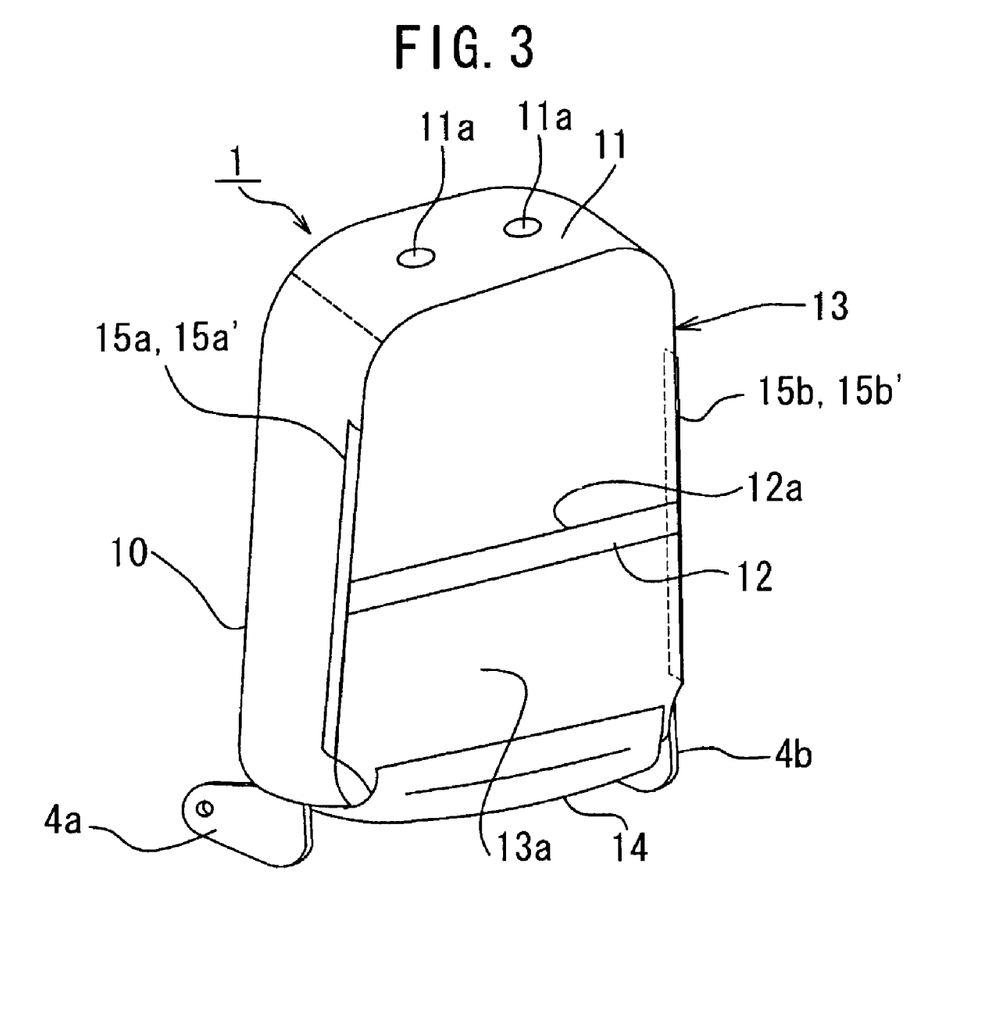
FIG. 3 is a schematic perspective view of a seat back employing a cushion according to an embodiment of the present invention, as viewed from a rear side.

Referring now to FIG. 3, there is illustrated a seat back for a vehicle seat, which employs a cushion according to an embodiment of the present invention. The cushion includes a three-dimensional cover 1 and a foam resin padding (not shown) arranged in the three-dimensional cover 1 and integrated with the three-dimensional cover 1.

Figure 4:
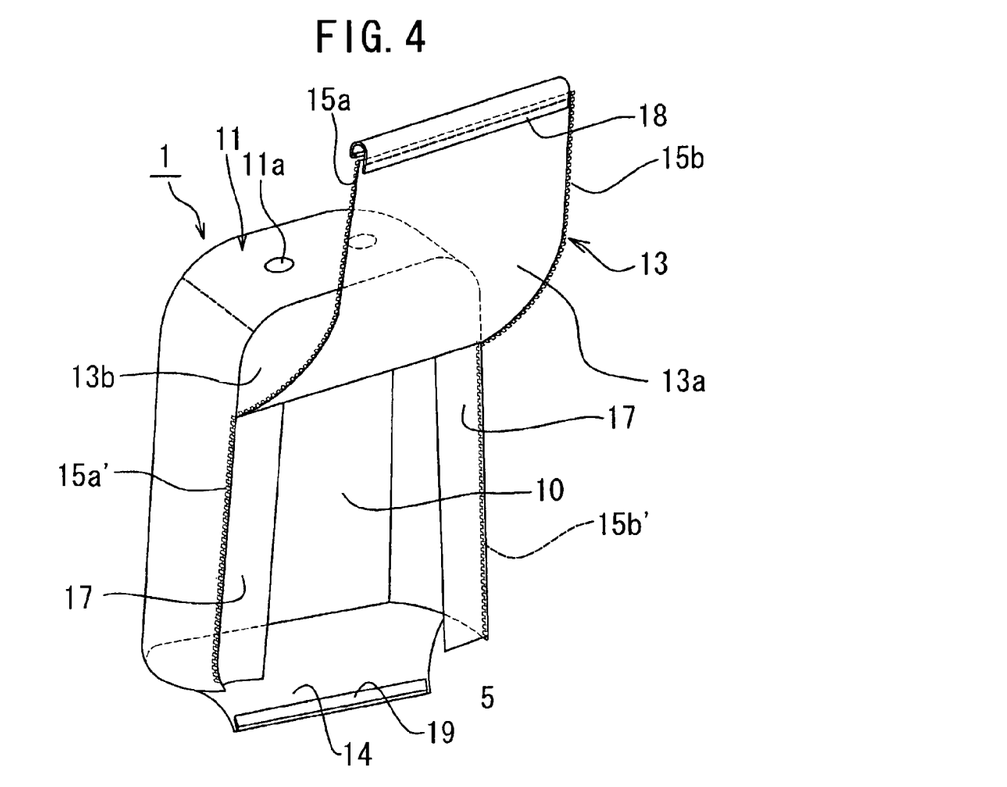
FIG. 4 is a schematic perspective view of a cover for the cushion of FIG. 3, with a rear side section thereof being opened.

Referring to FIG. 4, the cover 1 includes a front side section 10, a substantially U-shaped rear side section 13 spaced apart from the front side section 10 and opposed to the front side section 10, a peripheral section 11 disposed between the front side section 10 and the rear side section 13, extending along peripheral edges of the front and rear side sections 10, 13 except lower edges of the front and rear side sections 10, 13, and attached to the peripheral edges of the front and rear side sections 10, 13 at edges of the peripheral section 11, and a lower side section 14 attached at an edge thereof to a lower edge of the front side section 10.

The rear side section 13 includes a pair of spaced apart side portions 17 and an upper portion 13b connected to upper edges of the spaced apart side portions 17 and interconnecting the spaced apart side portions 17. The cover 1 further includes a substantially belt-shaped piece 13a having a width substantially equal to a total width of the cover 11. The belt-shaped piece 13a is connected to the rear side section 13 with an upper edge thereof extending along a lower edge of the upper portion 13b of the rear side section 13 and hangs down from the lower edge of the upper portion 13b, whereby an opening of the U-shaped rear side section 13 is adapted to be openably closed with the belt-shaped piece 13a.

In the illustrated example, the respective sections of the cover 1 except the side portions 17 of the rear side section 13 are each formed from a piece which includes a piece of covering material such as fabric, leather, etc., and a piece of wadding material such as foamed resin laminated with the piece of covering material. On the other hand, the side portions 17 of the rear side section 13 are each formed from a resin film.

As shown in FIG. 3, a pocket 12 is provided on the belt-shaped piece 13a of the cover 11. The pocket 13 has an opening 12a which is openable along a substantially total width of the belt-shaped piece 13a.

Moreover, as shown in FIG. 4, the cover 1 further has slide fastener means which includes two pairs of zipper tapes 15a, 15a', 15b, 15b' and two slider assemblies including slider and tags (not shown). More particularly, the first zipper tape 15a is attached to and substantially coextensive with an edge of one of both sides of the belt-shaped piece 13a. A second zipper tape 15a' is attached to and substantially coextensive with a first vertical edge region of the peripheral section 11 which is adjacent an outer edge of the one of the side portions 17 of the rear side section 13. A first slider assembly (not shown), supported by the first zipper tape 15a and the second zipper tape 15a', is included for zipping and unzipping the first zipper tape 15a with respect to the second zipper tape 15a'. Also, a third zipper tape 15b is attached to and substantially coextensive with an edge of the other of the both side of the belt-shaped piece 13a. A fourth zipper tape 15b' is attached to and substantially coextensive with a second vertical edge region of the peripheral section 11 which is adjacent an outer edge of the other of the side portions 17 of the rear side section 13. A second slider assembly (not shown), supported by the third zipper 15b and the fourth zipper tape 15b', is included for zipping and unzipping the third zipper tape 15b with respect to the fourth zipper tape 15b'. The first slider assembly and the second slider assembly are slid upward along the first and second zipper tapes 15a, 15a' and the third and fourth zipper tapes 15b, 15b', respectively, whereby the zipper tapes 15a, 15a', 15b, 15b' are unzipped, the belt-shaped piece 13a is separated from the peripheral section 11 of the cover 1 and the opening of the rear side section 13 is brought into a condition where it is allowed to be opened. On the other hand, the first slider assembly and the second slider assembly are slid downward along the first and second zipper tapes 15a, 15a' and the third and fourth zipper tapes 15b, 15b', respectively, whereby the zipper tapes 15a, 15a', 15b, 15b' are zipped, the belt-shaped piece 13a is separatably coupled to the peripheral section 11 of the cover 1 and the opening of the rear side section 13 is closed with the belt-shaped piece 13a.

The belt-shaped piece 13a has an engaging fastener 18 of a substantially J-shape in cross-section attached to a lower edge thereof. The lower side section 14 of the cover 1 has an engaging fastener 19 of a plate shape attached to an edge of a free end thereof. The engaging fastener 18 and the engaging fastener 19 are adapted to be disengageably engaged with each other.

The foam resin padding which is to be integrated with the three-dimensional cover 1 is integrated with the respective sections of the cover 1 except the belt-shaped piece 13a and the lower side section 14 of the cover 1, by a die apparatus which will be discussed hereinafter. A cavity for receiving a frame for the cushion therein is formed in a rear section of the padding by a core of the die apparatus as will be discussed hereinafter.

The both side portions 17 of the rear side section 13 have lengths which allow the both side portions 17 to cover or conceal, from the inner side, the entire edge of the belt-shaped piece 13a to which the first zipper tape 15a is attached, the entire vertical edge region of the peripheral section 11 to which the second zipper tape 15a' is attached, the entire edge of the belt-shaped piece 13a to which the third zipper tape 15b is attached, and the entire vertical edge region of the peripheral section 11 to which the fourth zipper tape 15b' is attached.

Figure 5:
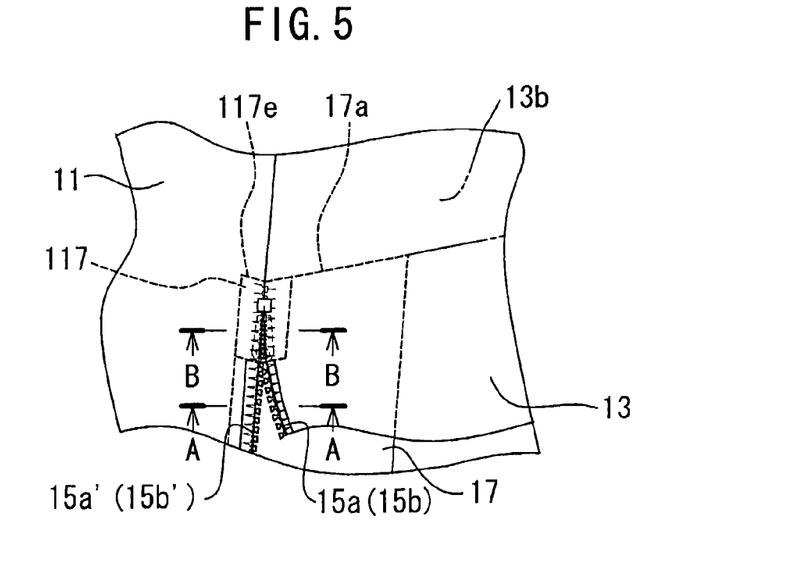
FIG. 5 is a schematic fragmentary perspective view illustrating a condition where the rear side section of the cover of the cushion of FIG. 3 is opened.
Figure 6:
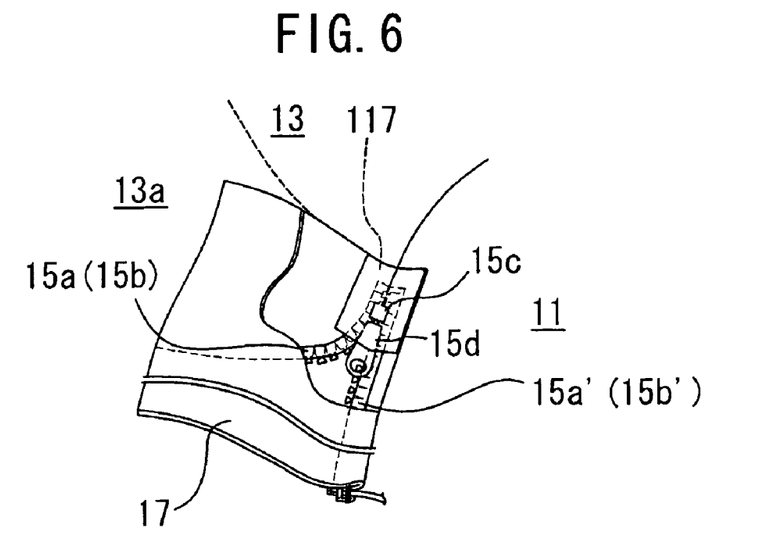
FIG. 6 is a schematic fragmentary perspective view illustrating the cover in the opened-state, as viewed from an inner side of the cover.

Referring to FIGS. 5 and 6, upper end portions of the first and second zipper tapes 15a, 15a' (and upper end portions of the third and fourth zipper tapes 15b, 15b') are disposed downward of an upper edge 17a of a corresponding side portion 17 of the rear side section 13. While a space is easy to be produced between the upper end portions of the first and second zipper tapes 15a, 15a' (and the third and fourth zipper tapes 15b, 15b'), the upper end portions of the zipper tapes are adapted to be completely covered or concealed by the corresponding side portion 17 of the rear side section 13 from the inner side. Incidentally, upper edges of the first and second zipper tapes 15a, 15a' (and the third and fourth zipper tapes 15b, 15b') and the upper edge 17a of the corresponding side portion 17 of the rear side section 13 may be disposed in the substantially same level.

Figure 7:
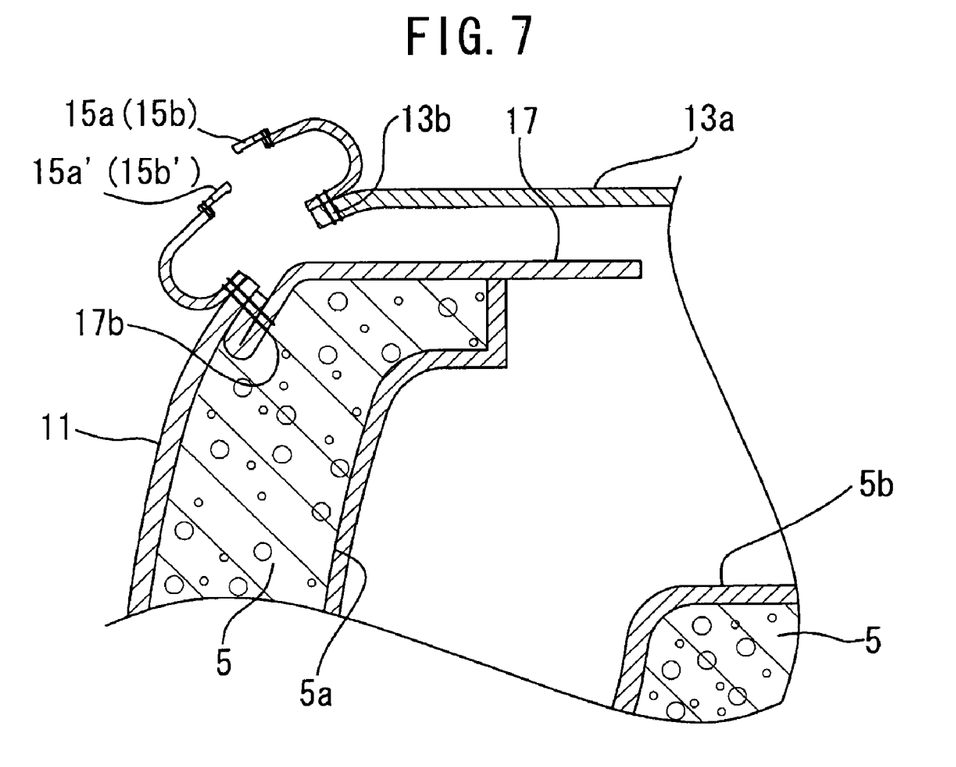
FIG. 7 is a schematic sectional view of the cushion of FIG. 3, taken along a line A-A in FIG. 5.
Figure 8:
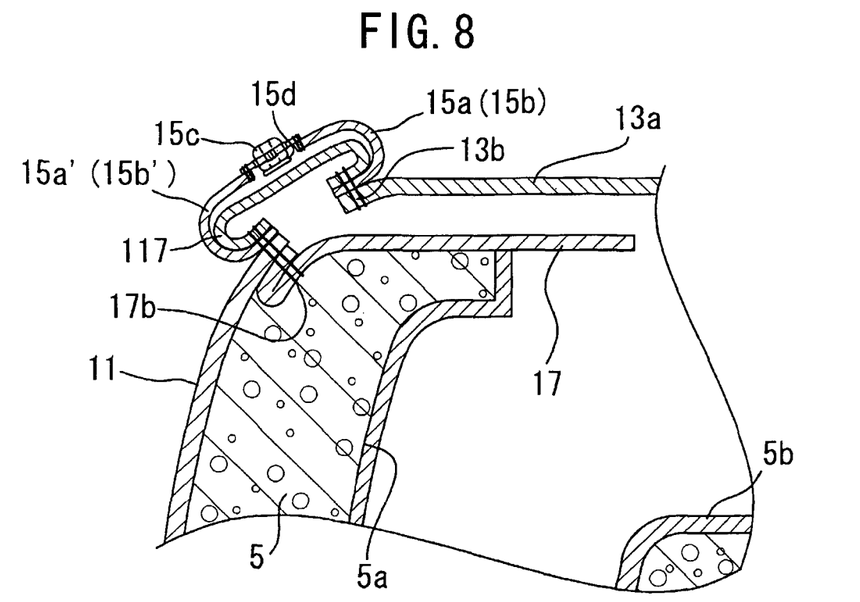
FIG. 8 is a schematic sectional view of the cushion of FIG. 3, taken along a line B-B in FIG. 5.

In the illustrated example, as shown in FIGS. 7 and 8, a longitudinal edge portion of the second zipper tape 15a' (and a longitudinal edge portion of the fourth zipper tape 15b') is superposed on an outer surface of the first vertical edge region (and an outer surface of the second vertical edge region) of the peripheral section 11 and a folded outer edge portion of the corresponding side portion 17 is superposed on an inner surface of the first vertical edge region (and an inner surface of the second vertical edge region) of the peripheral section 11. The longitudinal edge portion of the second zipper tape 15a' (and the longitudinal edge portion of the fourth zipper tape 15b'), the first vertical edge region (and the second vertical edge region) of the peripheral section 11, and the folded outer edge portion of the corresponding side portion 17 are sewed together. Moreover, the first and third zipper tapes 15a, 15b are sewed at longitudinal edge portions thereof to the both vertical edge portions of the belt-shaped piece 13a with the longitudinal edge portions thereof being arranged outer surfaces of the edge portions of the belt-shaped piece 13a. Thus, when the zipper tapes 15a, 15a' are engaged with each other and the zipper tapes 15b, 15b' are also engaged with each other, a sewed region 17b which is formed by causing the longitudinal edge portion of the second zipper tape 15a' (and the longitudinal edge portion of the fourth zipper tape 15b'), the first vertical edge region (and the second vertical edge region) of the peripheral section 11, and the folded outer edge portion of the corresponding side portion 17 to be sewed together, and a sewed region 13b which is formed by causing the longitudinal edge portions of the zipper tapes 15a, 15b and the both edge portions of the belt-shaped piece 13a to be sewed together are covered or concealed as shown in FIG. 8. As shown in FIGS. 5, 6 and 8, a substantially rectangle-shaped sheet 117 of resin is disposed on the upper end portions of the first and second zipper tapes 15a, 15a' (and the third and fourth zipper tapes 15b, 15b'). The resin sheet 117 serves as means to conceal a slider 15c and a tag 15d of a corresponding slider assembly from the inner side and conceal a space between upper parts of the sewed regions 13b, 17b from the outer side, when the slider 15c is slid along the zipper tapes 15a, 15a' (or the zipper tapes 15b, 15b'), arrives at the upper end portions of the zipper tapes 15a, 15a' (or the zipper tapes 15b, 15b') and the zipper tapes are completely unzipped.

The resin sheet 117 is provided in such a manner that an upper edge 117e thereof (FIG. 5) is located upward of the slider 15c arriving at the upper end portions of the zipper tapes. The resin sheet 117 is sewed at both edges thereof to the sewed regions 13b, 17b so as to straddle the edge region of the peripheral section 11 and a corresponding edge portion of the belt-shaped piece 13a.

Incidentally, in the illustrated embodiment, as shown in FIGS. 7 and 8, an entire surface of the cavity 5a for receiving the frame for the cushion therein, which is formed in the rear section of the padding 5 by the core of the die apparatus as will be discussed hereinafter, is adapted to be covered with a sheet 5b of backing material which is attached onto the entire surface of the cavity 5a of the padding 5 by the die apparatus. The backing sheet 5b serves as means to prevent the padding 5 from being rubbed directly against the frame at the time of inserting operation of the frame into the cavity 5a of a finished seat. The backing sheet is formed from a sheet of non-woven fabric or the like.

Figure 9:
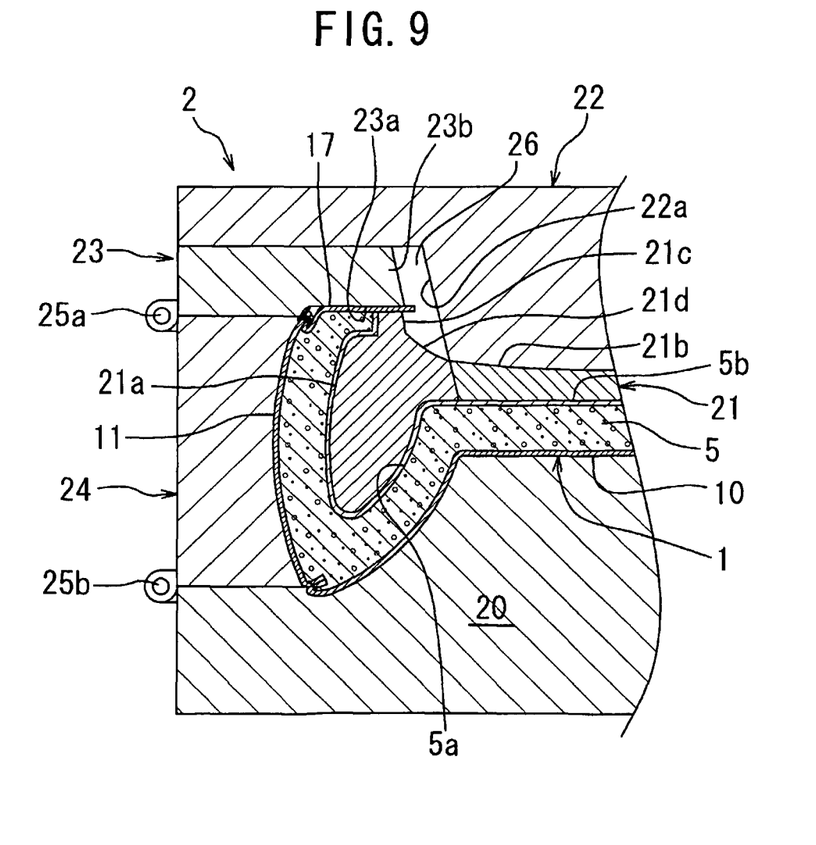
FIG. 9 is a schematic sectional view illustrating a die apparatus for forming the cushion of FIG. 3, in which the cover is shown in cross-section.
Figure 10:
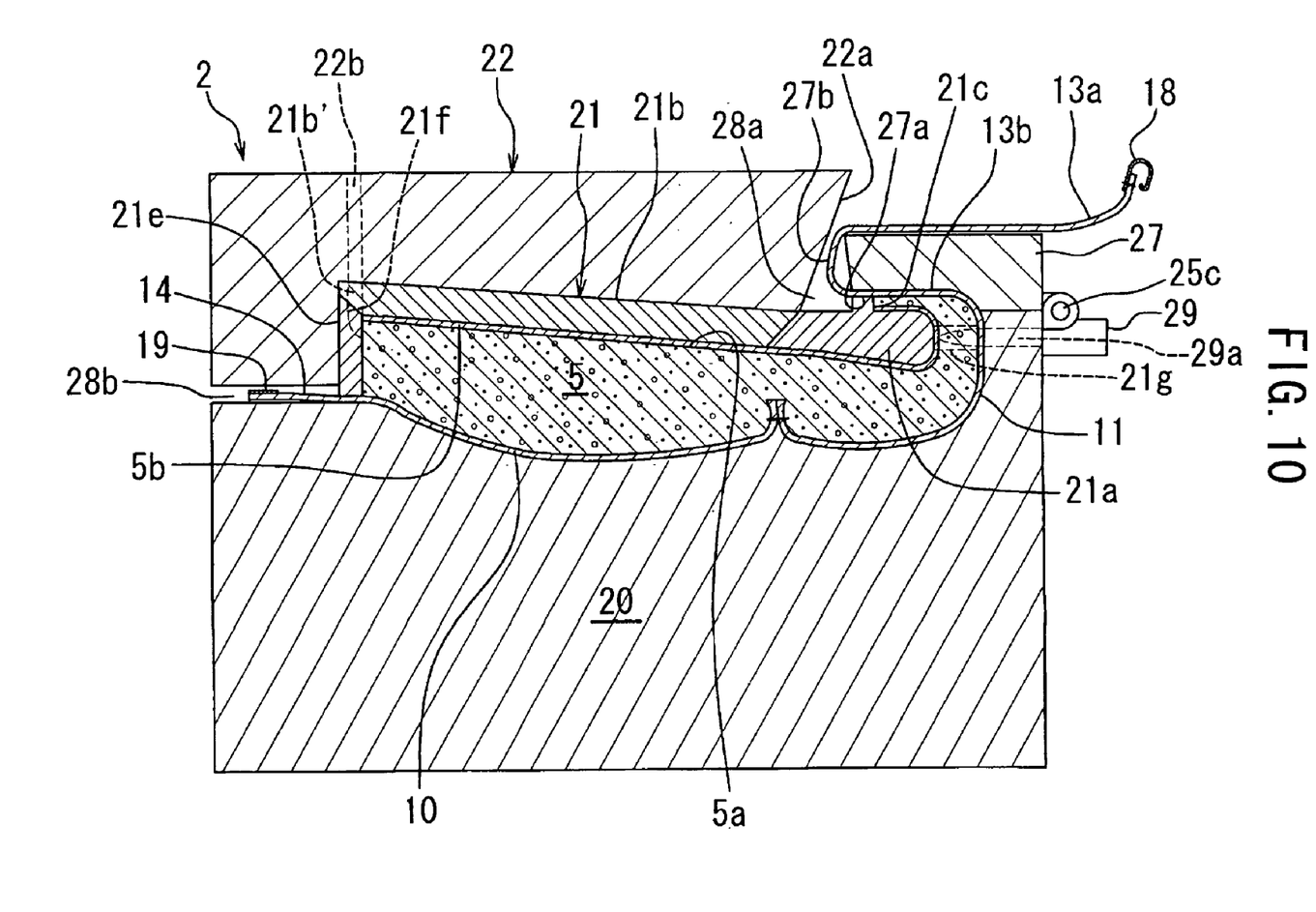
FIG. 10 is a schematic sectional view showing the die apparatus for forming the cushion of FIG. 3, in which the cover is shown in vertical-section.

The cushion for the seat back, which is constructed as discussed above, may be produced by, for example, a die apparatus 2 which is shown in FIGS. 9 and 10.

The die apparatus 2 includes a first die means 20 for forming front and rear sections and a peripheral section of the cushion, a core 21 for forming the cavity 5a opened in the rear section of the foam padding 5 and causing the backing sheet 5b to cover the cavity, and a second die means 22 adapted to be combined with the first die means 20 and clamped against the first die means 20 when the cushion is to be formed by the die apparatus. At the forming of the cushion, the cover 1 is to be laid on the first die means 20.

While FIG. 9 shows only half of the die apparatus 2, the die apparatus 2 has a geometric symmetry structure. Incidentally, in the event that an air-permeable cover is employed as the cover 1, the first die means 20 on which the cover 1 is to be laid preferably has air-ventilating holes (not shown). In this case, a vacuum pump means (not shown) for providing a vacuum is coupled to the air-ventilating holes through paths. When the vacuum is applied to the first die means 20 by the vacuum pump means, the vacuum is applied through the air-ventilating holes to the cover 1 on the first die means 20, to thereby cause the cover 1 to be drawn onto and set on the first die means 20.

As shown in FIG. 9, the first die means 20 is provided with a first sectional die means 23 for forming the rear section of the cushion, and a second sectional die means 24 for forming the peripheral section of the cushion. The first sectional die means 23 is coupled to the second sectional die means 24 by a first hinge means 25a. The second sectional die means 24 is coupled to the first die means 20 by a second hinge means 25b. Thus, the first and second sectional die means 23, 24 can be opened and closed with respect to the first die means 20 by the first and second hinge means 25a, 25b.

When the die apparatus 2 is to form the cushion, the first sectional die means 23 is adapted to be contacted with the side portions 17 of the rear side section of the cover 1 (laid on the first die means 20) at a die surface 23a thereof. The first sectional die means 23 has an inner slant surface 23b which is to face a slant surface 22a of the second die means 22.

The core 21 includes a first section 21a and a second section 21b which are dividable. The first section 21a of the core 21 is provided with a protrusion 21c which is to face the die surface 23a of the first sectional die means 23, and a slant surface 21d which extends from the protrusion 21c and is to face the slant surface 22a of the second die means 22. When the die apparatus 2 is to form the cushion, the side portions 17 of the rear side section 13 of the cover 1 are interposed between the die surface 23a of the first sectional die means 23 and the protrusion 21c of the core 21 with free edge portions of the side portions 17 of the rear side section 13 being received within a first spaces 26 which is defined by the inner slant surface 23b of the first sectional die means 23, the slant surface 22a of the second die means 22, the slant surface 21d of the first section 21a of the core 21, and the protrusion 21c of the first section 21a of the core 21.

As shown in FIG. 10, the first die means 20 is further provided with a third sectional die means 27 which is to be contacted with the upper portion 13b of the rear side section 13 of the cover 1. The third sectional die means 27 is coupled to the first die means 20 by a third hinge means 25c so as to be openable and closable with respect to the first die means 20. The third sectional die means 27 has a planar surface 27a which is to face the protrusion 21c of the first section 21a of the core 21, and an inner surface 27b which is to face the slant surface 22a of the second die means 22. The upper portion 13b of the rear side section 13 is interposed between the planar surface 27a of the third sectional die means 27 and the protrusion 21c of the first section 21a of the core 21.

The second die mean 22 has a pouring hole 22b for allowing expandable resin to be poured into the die apparatus 2 therethrough. Arranged tangentially with an end of the second section 21b of the core 21 is a hold-down sectional die means 21e of a plate-shape for holding against the first die means 20 a boundary between the lower side section 14 and the front side section 10 of the cover 1. The hold-down sectional die means 21e has a notch 21f for allowing the expandable resin from the pouring hole 22b of the second die means 22 to flow into the cover 1. The notch 21f of the hold-down sectional die means 21e communicates with the pouring hole 22b of the second die means 22 through a hole 21b' formed in the second section 21b of the core 21. Two pipes 21g (only one pipe 21g is shown in FIG. 10) for forming through-holes in the padding 5 for receiving stays of a head rest are arranged in close proximity to the first section 21a of the core 21 and aligned with through-holes 11a (see FIGS. 3 and 4) of the cover 1.

A second space 28a is defined between the second die means 22 and the third sectional die means 27. Through the second space 28a, the belt-shaped piece 13a of the cover 1 can be drawn out of the die apparatus 2. Further, a third space 28b is defined between the first die means 20 and the second die means 22. The lower section 14 of the cover 1 is received in the third space 28b.

The die apparatus 2 is further provided with two cylinders 29 having positioning pins 29a which are adapted operatively penetrate the through-holes 11a (FIGS. 3 and 4) of the cover 1 and fit into the pipes 21g.

Again referring to FIGS. 9 and 10, the forming of the cushion which is performed utilizing the die apparatus of FIGS. 9 and 10 will be discussed hereinafter.

In a condition where the second die means 22 is removed from the first die means 20 and the first, second and third sectional die means 23, 24, 27 are opened with respect to the first die means 20 by the hinge means 25a, 25b, 25c, the cover 1 is laid on a die surface of the first die means 20 with the belt-shaped piece 13a being separated from the peripheral section 11 of the cover 1 by unzipping the first and third zipper tapes 15a, 15b of the belt-shaped piece 13a from the second and fourth zipper tapes 15a', 15b'. In the condition where the cover 1 is set on the die surface of the first die means 20, the hold-down sectional die means 21e is combined with the first die means so as to be put on the boundary between the front side section 10 and the lower side section 14 against the first die means 20, the core 21 is inserted into the three-dimensional cover 1, with the backing sheet 5a being wound at an end portion thereof around the first section 21a of the core 21 and extending along bottom surfaces of the first and second sections 21a, 21b of the core 21. Moreover, the pipes 21g are arranged between the first section 21a of the core 21 and a top portion of the peripheral section 11 of the cover 11, and the positioning pins 29a of the cylinders 29 are operatively fitted into the pipes 21g. Thereafter, the first, second and third sectional die means 23, 24, 27 are closed with respect to the first die means 20 and clamped against the first die means 20. The second die means 22 is then combined with the first die means 20 and clamped against the first die means 20 in a condition where the free edge portions of the side portions 17 of the rear side section 13 of the cover 1 are received within the first space 26, the belt-shaped piece 13a of the cover 1 is drawn out of the die apparatus 2 through the second space 28a, and the lower section 14 of the cover 1 is received within the third space 28b. In this condition, the expandable resin is poured into the interior of the cover 1 through the pouring hole 22b of the second die means 22, the hole 21b' of the core 21 and the notch 21f of the hold-down sectional die means 21e, and foams in the interior of the cover 1, whereby a cushion in which the padding 5 of the foaming resin is integrated with the cover 1 and the backing sheet 5b and formed with the cavity 5a for receiving the seat back frame is formed.

In the die apparatus 2, the upper portion 13b of the rear side section 13 of the cover 1 is interposed between the die surfaces 23a, 27a of the first and third sectional die means 23, 27 and the protrusion 21c of the core 21, and the boundary between the front side section 10 and the lower side section 14 is interposed between the die surface of the first die means 20 and the hold-down sectional die means 21e. Therefore, a portion of the foaming resin is prevented from being impregnated into the belt-shaped piece 13a and the lower side section 14 of the cover 1. Thus, the finished cushion which exhibits an appropriate cushioning property and a good touch feeling property can be obtained.

After the finished cushion which is formed in the manner as discussed above is removed from the die apparatus, the seat back frame is incorporated into the cavity 5a of the padding 5 of the cushion in the condition where the zipper tapes 15a, 15a', 15b, 15b' remain unzipped and the rear side section 13 of the cover 1 is opened by the belt-shaped piece 13a separated from the peripheral section 11 due to the unzipping of the zipper tapes. More particularly, as shown in FIG. 3, the seat back frame is incorporated into the cavity 5a of the padding 5 (FIGS. 9 and 10) of the cushion with side brackets 4a, 4b thereof projecting out of the cover 1. Then, the belt-shaped piece 13 is coupled to the peripheral section 11 of the cover 1 by zipping the first and third zipper tapes 15a, 15b with respect to the second and fourth zipper tapes 15a', 15b', to thereby conceal the opening of the rear side section 13 of the cover 1 with the belt-shaped piece 13.

In the cushion for the seat, which is constructed as discussed above, while the first and third zipper tapes 15a, 15b are sewed to the edges of the belt-shaped piece 13a, and the second and fourth zipper tapes 15a', 15b' are sewed to the vertical edge regions of the peripheral section 11 of the cover 1, the sewed portion 13b between the first zipper tape 15a (and the third zipper tape 15b) and the edge of the belt-shaped piece 13a, and the sewed portion 17b between the second zipper tape 15a' (and the fourth zipper tape 15b') and the vertical edge region of the peripheral section 11 are concealed inside the zipper tapes as shown in FIG. 8. Thus, the cushion having a good visual appearance can be obtained.

Moreover, the belt-shaped piece 13a has the width equal to the total width of the cover 1, so that the pocket 12 having a wide width can be provided on the belt-shaped piece 13a as shown in FIG. 3.

In addition, when the cushion is to be formed, the second and fourth zipper tapes 15a', 15b' are insulated through the side portions 17 of the rear side section of the cover 1 from the expandable resin poured into the interior of the cover 1 as shown in FIG. 9, so that the expandable resin does not adhere to the second and fourth zipper tapes 15a', 15b'. Moreover, the rectangle-shaped resin piece 117 straddles the upper end portions of the first and second zipper tapes 15a, 15a' (and the third and fourth zipper tapes 15b, 15b'), to which the slider 15c with the tag 15d is slid, and protects an upper part of the vertical edge region of the peripheral section 11 and an upper part of the vertical edge portion of the side portion 17 of the rear side section 13. Therefore, there is no possibility that a jointed region between the upper part of the vertical edge region of the peripheral section 11 and the upper part of the vertical edge portion of the side portion 17 will be broken, and the expandable resin can be prevented from adhering to the slider 15c and the tag 15d.

Moreover, the vertical edge portions of the side portions 17 of the rear side section 13 are folded and sewed to the vertical edge regions of the peripheral section 11, so that strength of the sewed portions 17b of the cover 1 is ensured. Incidentally, the side portions 17 of the rear side section 13 may be formed of flexible material. In this case, operability of sewing the side portions 17 to the peripheral section 11 and operability of causing the cover 1 to be laid on the first die means can be improved, thus making it possible to easily produce the cushion.

Figure 11:
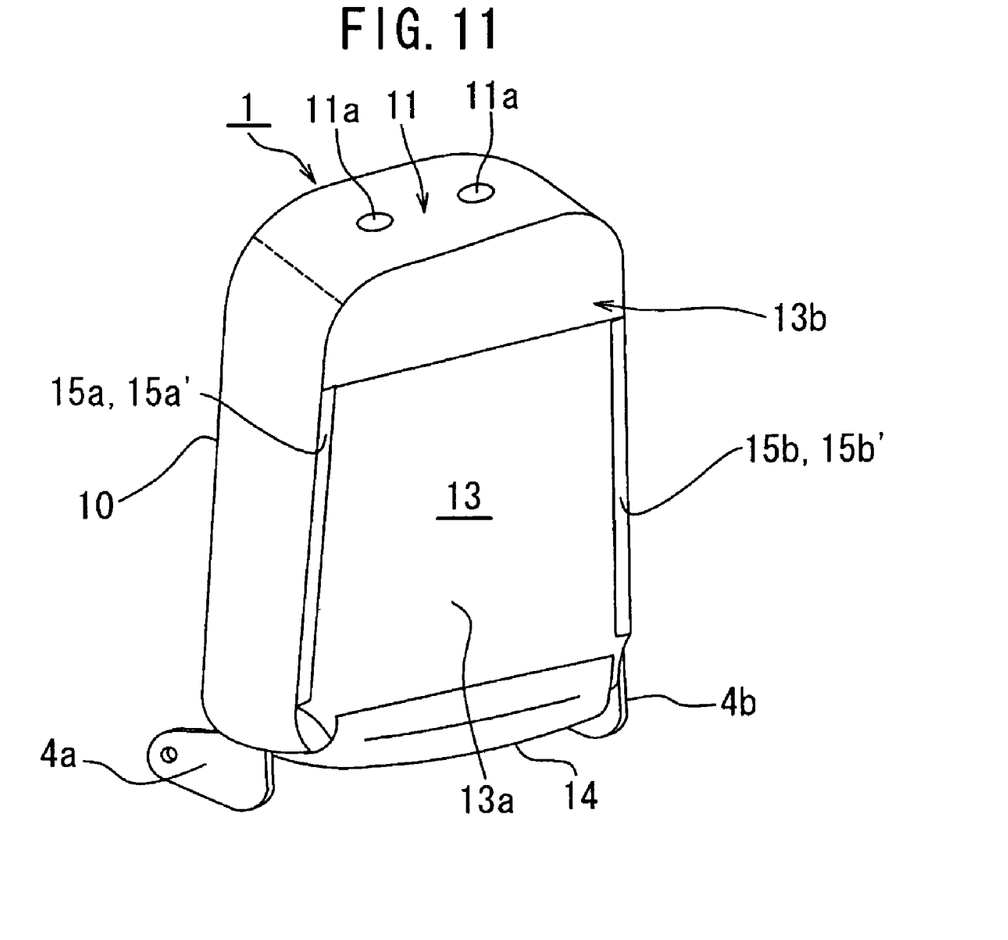
FIG. 11 is a schematic perspective view of a seat back employing a cushion according to another embodiment of the present invention, as viewed from a rear side.

Incidentally, while the case where the present invention is applied to the cushion provided with the pocket has been discussed above with reference to the embodiment of the present invention, the present invention may be applied to a cushion which is not provided with any pocket as shown in FIG. 11. Moreover, the zipper tapes 15a, 15a', 15b, 15b' may be designed such that they are exposed on the both edges of the belt-shaped piece 13a in the condition where the zipper tapes 15a, 15a', 15b, 15b' are zipped. In addition, while the case where the present invention is applied to the cushion for the seat back of the vehicle seat has been discussed above with reference to the embodiment of the present invention, the present invention may be also applied to a cushion for a seat cushion of a vehicle seat.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

The invention claimed is:
1. A cushion for a seat, including a foam padding integral with a three-dimensional cover covering said padding, said three-dimensional cover comprising:
   a first surface section;
   a second surface section spaced apart from said first surface section and facing said first surface section;

said second surface section having a pair of spaced apart side portions and an opening defined between said pair of spaced apart side portions;

a peripheral surface section disposed between said first and second surface sections, extending along peripheral edges of said first and second surface sections, and attached at edges thereof to said peripheral edges of said first and second surface sections;

a substantially belt-shaped piece having a width equal to a total width of said cover and provided at said second surface section so as to openably close said opening of said second surface section;

a first pair of zipper tapes;

one of said first pair of zipper tapes being provided along one of both side edges of said belt-shaped piece;

the other of said first pair of zipper tapes being provided along a first region of said edges of said peripheral surface section which positionally corresponds to the one of said both side edges of said belt-shaped piece;

a second pair of zipper tapes;

one of said second pair of zipper tapes being provided along the other of the both side edges of said belt-shaped piece;

the other of said second pair of zipper tapes being provided along a second region of said edges of said peripheral surface section which positionally corresponds to the other of said both side edges of said belt-shaped piece;

a first slider assembly supported by said first pair of zipper tapes for zipping and unzipping said first pair of zipper tapes; and a second slider assembly supported by said second pair of zipper tapes for zipping and unzipping said second pair of zipper tapes;

said opening of said second surface section being adapted to be closed with said belt-shaped piece at the time when said first slider assembly and said second slider assembly zip said first pair of zipper tapes and said second pair of zipper tapes, respectively; and said padding being integrated with sections of said cover except said belt-shaped piece.

2. A cushion for a seat according to claim 1, wherein said belt-shaped piece is provided with a pocket which is openable along a total width of the belt-shaped piece.

3. A cushion for a seat according to claim 1 or 2, wherein said second surface section has folded both side edges which are sewed to regions of a peripheral edge of said peripheral surface section.

4. A cushion for a seat according to claim 3, wherein a longitudinal edge of the other of said first pair of zipper tapes and a longitudinal edge of the other of said second pair of zipper tapes are superposed on and sewed to said folded both side edges of said second surface section.

5. A cushion for a seat according to claim 1, wherein said pair of spaced apart side portions of said second surface section are each formed from a resin film.

* * * * *